W. J. MacFARLAND & W. G. EATON.
METHOD FOR FORMING DIES.
APPLICATION FILED JUNE 19, 1908.
1,020,297.
Patented Mar. 12, 1912.
2 SHEETS—SHEET 1.
Fig. 1.
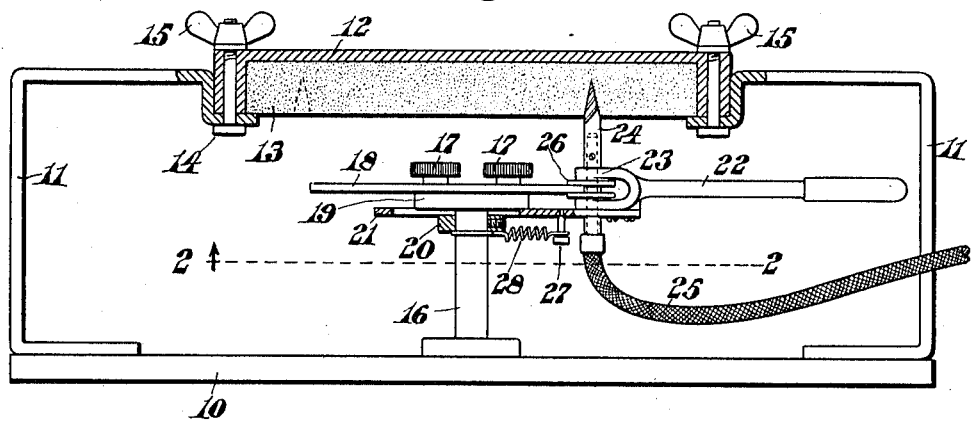
Fig. 2.
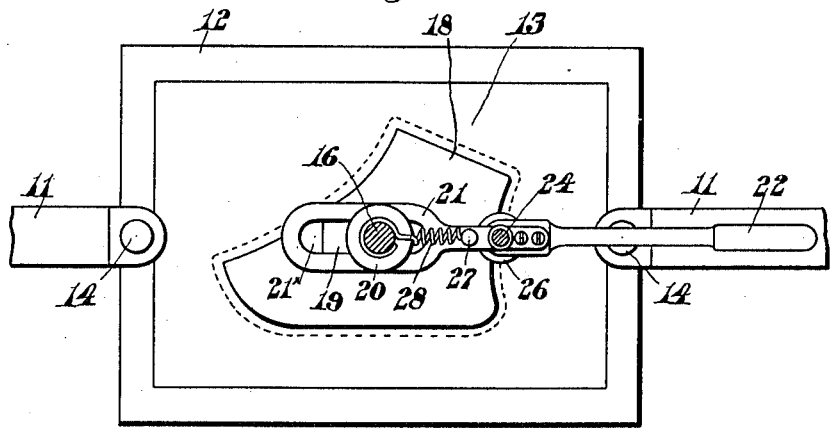
Fig. 3.
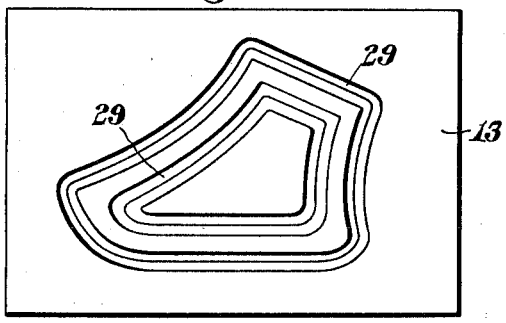
Fig. 4.
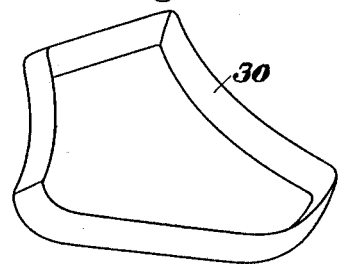
Witnesses:
Nathan C. Lombard
Edna C. Cleveland
Fig. 5.
Inventors:
William J. MacFarland,
William G. Eaton,
by Walter E. Lombard
Attys.

W. J. MacFARLAND & W. G. EATON.
METHOD FOR FORMING DIES.
APPLICATION FILED JUNE 19, 1908.
1,020,297.
Patented Mar. 12, 1912.
2 SHEETS—SHEET 2.
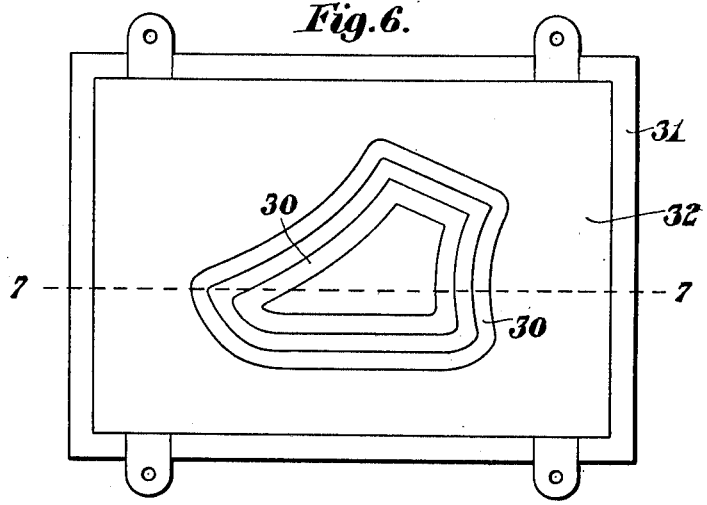
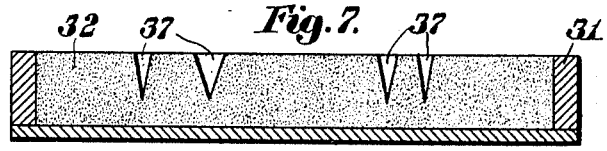
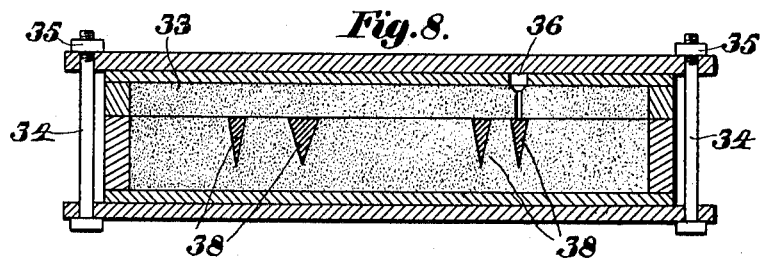
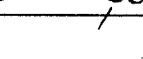
Witnesses:
Nathan C. Lombard
Edna C. Cleveland
Inventors:
William J. MacFarland,
William G. Eaton,
by Walter E. Lombard,
Atty.

UNITED STATES PATENT OFFICE.

WILLIAM J. MacFARLAND, OF EVERETT, AND WILLIAM G. EATON, OF BOSTON, MASSACHUSETTS.

METHOD FOR FORMING DIES.

1,020,297.     Specification of Letters Patent.     Patented Mar. 12, 1912.

Application filed June 19, 1908. Serial No. 439,468.

*To all whom it may concern:*

Be it known that we, WILLIAM J. MAC-FARLAND and WILLIAM G. EATON, citizens of the United States of America, and residents, respectively, of Everett, in the county of Middlesex, and Boston, in the county of Suffolk, both in the State of Massachusetts, have invented certain new and useful Improvements in Methods for Forming Dies, of which the following is a specification.

This invention relates to an improved method for forming cast dies to be used in cutting blanks in the manufacture of shoes or other articles and has for its object the production of a die capable of performing the work for which it is designed, which may be produced quickly and at a minimum of expense. Heretofore devices of this class have been produced from forged steel at considerable expense and with much labor. By our improved method this extra labor and expense is dispensed with.

The invention consists in suspending a plate of plastic or other suitable material such as plaster of Paris or clay above a suitable pattern plate of a shape which it is desired should be reproduced in a cutting die and following the outline of said pattern plate with a revoluble cutting member, the end of which is preferably tapered and adapted to cut into the plate of plastic material a continuous groove the side walls of which preferably are converging and the bottom of which throughout its length lies in the same horizontal plane. The plate of plastic material is then removed from the supporting members and a type metal or other suitable material is poured into the groove cut by said cutting member, in this manner producing a suitable pattern conforming to the outline of the blank which it is desired to cut. This pattern is then inserted in a suitable flask containing sand which upon removal will form in the usual manner a cavity in the sand, in which may be cast in steel a die adapted to be used for cutting blanks when its edges have been sharpened with the cutting edge at every point in the same horizontal plane.

In the drawings, which represent certain apparatus which is used in carrying out this improved method of forming dies,—Figure 1 represents an elevation partly in section of a device for supporting the plate of plastic material, the pattern support, and the device for operating the revoluble cutter to cut a groove into the plastic material conforming to the shape of the supported pattern. Fig. 2 represents a partial horizontal section of the same on line 2—2 on Fig. 1, looking in the direction of the arrow. Fig. 3 represents a plan of the plate of plastic material when the groove or shell has been cut therein. Fig. 4 represents a perspective view of the pattern cast in said plastic material. Fig. 5 represents a cross section through one of the cutting blades of said die. Fig. 6 represents a plan of one part of the flask with the pattern inserted in the sand therein. Fig. 7 represents a vertical section of the same, the cutting plane being on line 7—7 on Fig. 6 with the pattern removed. Fig. 8 represents a vertical section of the flask complete preparatory to pouring the molten steel therein to form the cutting die, and Fig. 9 represents an elevation of the cutting die cast within said flask.

Similar characters designate like parts throughout the several figures of the drawings.

In the drawings, 10 represents a suitable table which has secured thereto uprights 11, the upper ends of which are adapted to support a casing 12 having embedded therein a plate of plastic material 13, said casing being held in position on said uprights 11 by means of the bolts 14 and nuts 15.

Secured to the table 10 beneath the plate of plastic material 13 is a support 16 to the upper end of which is secured by means of the clamp screws 17 a pattern plate 18 which may be of any desired shape. Between the head 19 of said support 16 and a collar 20 secured to the shank of said support is interposed a slotted plate 21 through the slot 21* of which the shank of the support 16 extends. Secured to the plate 21 is a suitable handle 22, the inner end of which is forked and provided with bearings 23 for a revoluble cutting tool 24 the upper end of which is tapered and provided with suitable cutting edges as indicated in Fig. 1. This tool 24 may be revolved in any suitable manner, as, for instance, by means of the flexible driving member 25. In the bifurcated end of the handle 22 and surrounding the shank of the tool 24 is a suitable flanged wheel 26 the flanges of which are adapted to coincide with the upper and lower faces of the pattern plate 18. The plate 21 has secured thereto a pin 27 between which and the shank of the support 16 is interposed a spring 28 which is adapted to retain the smaller periphery of the flanged wheel 26 against the edge of the pattern plate 18 at all times.

It is obvious that with the various parts in the position shown in Fig. 1 an operator may seize the handle 22 and move it about the axis of the support 16, the wheel 26 following the outline of the pattern plate 18 and thereby cut into the sheet of plastic material 13, a continuous groove, the outline of which is the same as the pattern plate 18 except that it is slightly larger as indicated by dotted lines in Fig. 2.

The flanges of the wheel 26 prevent any endwise movement of the tool 24 so that when the groove or channel 29 has been cut into the sheet of plastic material the inner ends of the converging walls will all be in the same horizontal plane. The plate of plastic material is then capable of being used as a matrix from which a suitable pattern may be formed if suitable metal or other material is used in the formation of the pattern.

It is not practical to use a matrix of plastic material for the production of the cutting die itself from steel as the intense heat of the molten metal is liable to crack the material and make the pattern useless. For this reason type metal or other similar material is used in connection with the sheet of plastic material to form a pattern which may be ultimately used in the ordinary mold or flask, as will be hereinafter described. A matrix may be used, however, composed of compressed material such as sand or clay, into which the groove may be cut and in which a casting may be formed in the usual manner.

When the molten type metal or its equivalent is poured into the groove 29 and allowed to harden a continuous pattern 30 of a die of the required outline is secured, as indicated in Fig. 4, the cross section of every portion of the blade of which is shown in Fig. 5. The pattern 30 is then inserted in a flask 31 of any well-known construction, said flask being supplied with the usual sand 32. When the sand has been packed down sufficiently about the pattern 30, the pattern is removed as indicated in Fig. 7 and the top part 33 of the mold is placed in position and the various parts secured together by the bolts 34 and nuts 35. The molten steel is then poured through the opening 36 into the cavity 37 formed by the removal of the pattern 30 from the sand 32. When the casting has been completed the die 38 is removed from the mold or flask is hardened and the sides chamfered off to form a cutting edge, said cutting edge being in the same horizontal plane throughout its length. When a groove has been cut into the sheet of plastic material, from the pattern shown in the drawings, this pattern may be removed from its support and a larger or smaller one substituted therefor and the operation repeated, thereby forming in said sheet of material a plurality of grooves in which a plurality of patterns may be simultaneously formed. When the patterns have been used to form the required number of castings these patterns may be melted and the material used over and over again in the formation of other patterns.

It is obvious that any suitable construction of mechanism may be used in carrying out the invention without altering the principles of the invention.

While the drawings show and the specification describes the invention as applied particularly to the construction of cutting dies it is obvious that it may be applied equally as well to the production of castings to be utilized for other purposes.

By such a method of constructing dies a die is produced with very little labor which is capable, when hardened and sharpened, of use in cutting the blanks to be used in the manufacture of boots and shoes or other articles and such production is secured at very little expense.

It is believed that with the foregoing explanation the many advantages of this improved method of manufacturing dies will be fully apparent without any further description.

Having thus described our invention, we claim:

1. The method of forming dies, which consists in supporting a plastic plate opposite a pattern plate, cutting a groove into said plastic material with a revoluble tool following the edge of said pattern plate, casting a pattern of soft metal in said groove, inserting said soft metal pattern in the sand of a mold, removing the soft metal pattern from said sand, and casting in the cavity formed thereby in the sand a continuous die with converging sides.

2. The method of forming dies, which consists in supporting a plate of fine-grained plaster opposite a pattern plate, cutting a groove into said plate of plaster with a tool following the edge of said pattern plate, said tool having a movement independent of its movement along the edge of said pattern plate, casting a pattern of soft metal in said groove, inserting said soft metal pattern in the sand of a mold, removing the soft metal pattern from said sand, and casting in the cavity formed thereby in the sand a continuous die with converging sides.

3. The method of molding uniform articles, which consists in first supporting a sheet of plastic material opposite a pattern plate, cutting into said sheet of material with a revoluble tool following said pattern plate to form a mold, then pouring type metal into said mold to form a pattern, then embedding said type metal pattern in suitable molding material to form a second mold, then removing intact said type metal pattern from said second mold, and pouring casting metal into the cavity formed by said type metal pattern in the second mold.

Signed by us at 7 Water st., Boston, Mass., this 13th day of June, 1908.

WILLIAM J. MacFARLAND.
WILLIAM G. EATON.

Witnesses:
WALTER E. LOMBARD,
NATHAN C. LOMBARD.

---

Copies of this patent may be obtained for five cents each, by addressing the "Commissioner of Patents, Washington, D. C."